June 21, 1960 K. RIESZ ET AL 2,942,156
ELECTRICAL INSTRUMENT MOUNTING
Filed July 30, 1957 4 Sheets-Sheet 3
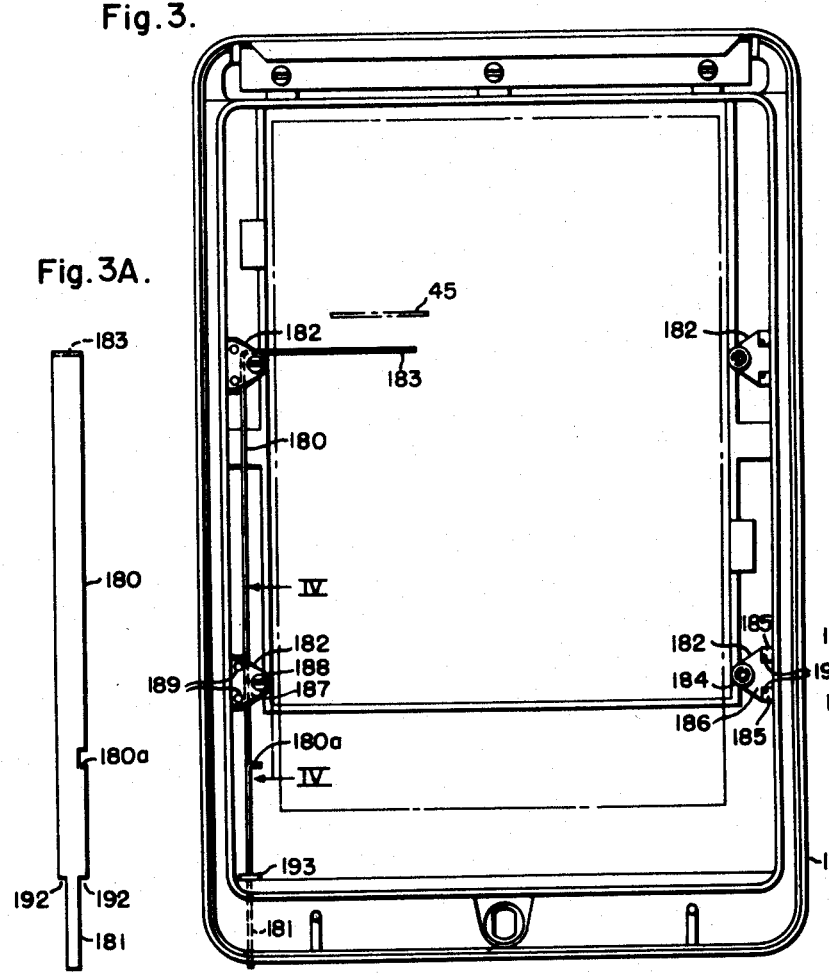
Fig.3.
Fig.3A.
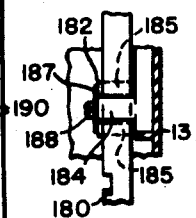
Fig.4.
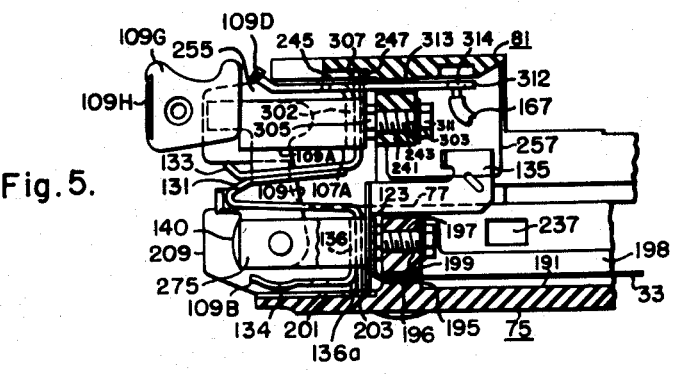
Fig.5.

United States Patent Office 2,942,156
Patented June 21, 1960

2,942,156
ELECTRICAL INSTRUMENT MOUNTING

Kolman Riesz, Gillette, William E. Rich, Chatham, and John Steckowich, Jr., Edison Township, Middlesex County, N.J., asisgnors to Westinghouse Electric Corporation, East Pittsburgh, Pa., a corporation of Pennsylvania Filed July 30, 1957, Ser. No. 675,074

9 Claims. (Cl. 317—99)

This invention relates to electrical apparatus, and it has particular relation to electrical apparatus including a structure for supporting an electrical device or instrument in operative position to permit ready withdrawal of the electrical device or instrument from operative position.

In the prior art, it has often been found convenient to mount an electrical device or instrument detachably on a supporting structure. Such mounting is particularly desirable for electrical devices or instruments such as integrating instruments, indicating instruments, recording instruments and relays which are flush mounted on a supporting structure such as a switchboard or panel. When an instrument is flush mounted on a switchboard or panel, the instrument movement is located substantially towards the rear of the switchboard or panel and consequently is in a position relatively inaccessible for inspection and servicing. For this reason, it is desirable to so mount the instrument that it may be removed readily for inspection and servicing. Examples of prior art detachable mountings for electrical instruments are shown in the West et al. Patent 2,286,044, the Smith et al. Patent 2,254,920, and the Chapman et al. Patent 2,388,575.

In the above-mentioned Chapman et al. patent a supporting structure is provided for a detachable electrical instrument. This supporting structure includes a casing having a detachable cover, which is proportioned to receive an electrical instrument. In order to permit ready removal of the electrical instrument from the casing, switch means are provided including parts carried by the instrument and parts on the casing. By actuation of the switch means, conductors secured to the casing and conductors secured to the instrument may be mechanically and electrically connected and disconnected. When the switch means is in disconnected condition, the electrical instrument may be removed readily from the associated casing.

Preferably the switch means takes the form of a knife switch having a contact jaw positioned on one of the relatively movable parts, such as the instrument, and having a knife blade pivotally secured to the remaining part, such as the casing, for rotation into and out of engagement with the associated contact jaw when the instrument is in operative position within the casing.

If a plurality of separate switches are required, these switches may have their knife blades connected for rotation as a unit into and out of engagement with their respective contact jaws. For maximum flexibility, however, the switches may be arranged for independent operation.

Instruments often include circuits which must be retained in a predetermined condition. For example, instruments often require current transformers which should never be open circuited. In accordance with the invention, improved means are provided for maintaining the required condition of such electrical circuits despite movements of the instrument with respect to its casing.

In a preferred embodiment of the invention such means comprises a back contact of resilient integral construction positioned beneath one of the knife blades for engagement by the knife blade when the blade is moved out of engagement with its associated jaw. Engagement of the blade with its back contact is effective to provide a desired circuit condition.

It is therefore an object of the invention to provide an improved electrical assembly including supporting means for detachably supporting an electrical instrument.

It is a further object of the invention to provide an improved electrical assembly including a supporting casing structure for detachably supporting an electrical instrument with switch means having parts on the supporting casing structure and parts on the electrical instrument for detachably connecting conductors positioned on the supporting structure and conductors positioned on the electrical instrument.

It is another object of the invention to provide an electrical assembly including a supporting structure for detachably supporting an electrical instrument with improved means for preventing movement of the instrument with respect to its supporting structure from modifying a desired condition of electrical circuits associated with the electrical assembly.

Other objects of the invention will be apparent from the following description taken in conjunction with the accompanying drawings, in which:

Fig. 3 is a view in rear elevation of a cover for positioning over the front of the casing of Fig. 1;

Fig. 3A is a view in side elevation of a reset strap for performing a reset operation upon the instrument of Fig. 2;

Fig. 4 is a view taken along the line IV—IV of Fig. 3;

Fig. 5 is a detail view with parts in section showing switch assemblies employed in the instrument and casing assembly of Figs. 1 and 2;

Figure 1:
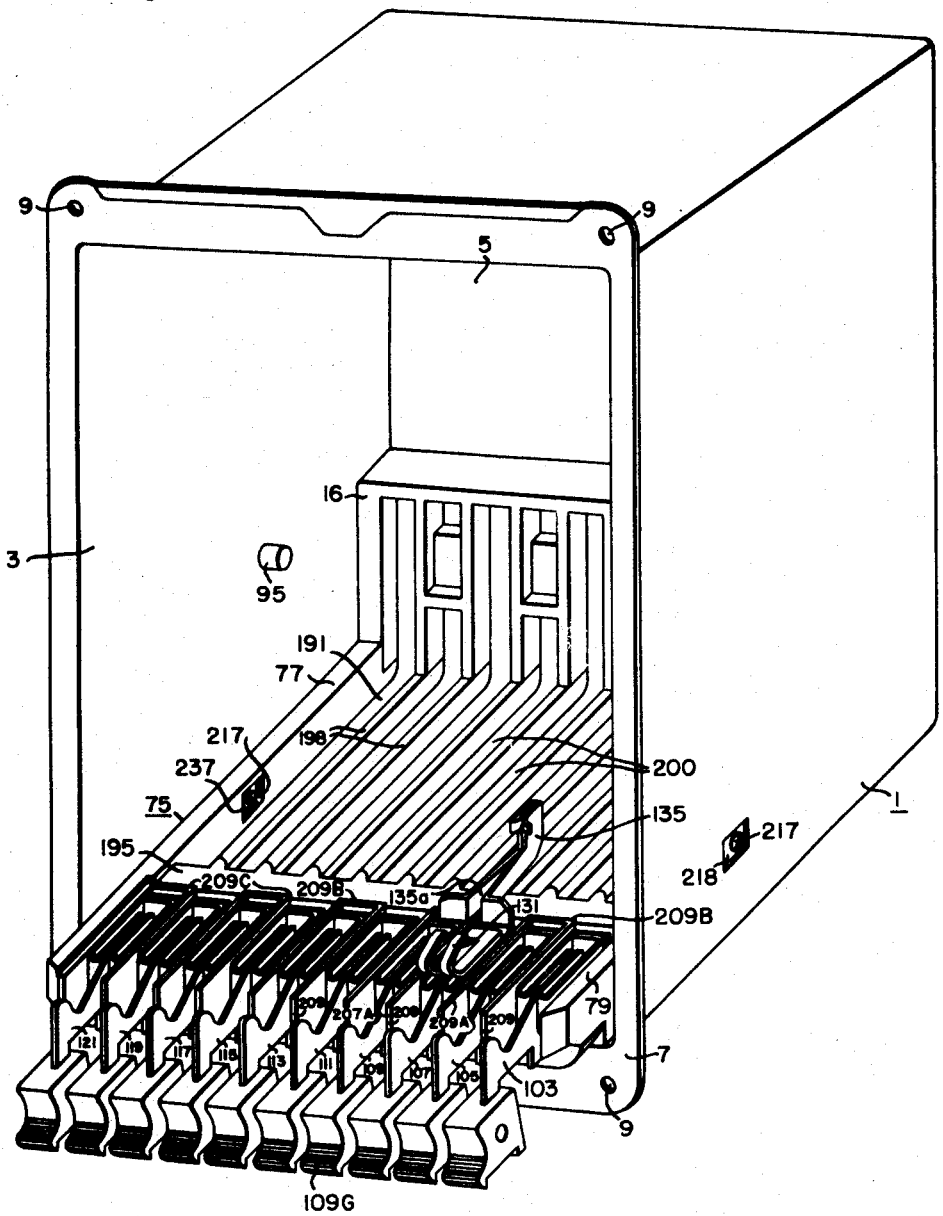
Figure 1 is a view in front perspective of a casing for an electrical instrument embodying the invention.

Referring to the drawings, Fig. 1 shows a portion of a supporting structure in the form of a casing 1 which is formed of a continuous wall 3 having a back closure 5 secured thereto. The front of the casing 1 is provided with a flange 7 having openings 9 therein through which screws may be inserted for the purpose of attaching the casing to a suitable supporting member such as a panel or switchboard. The wall 3, the back closure 5 and the front flange 7 may be secured to each other in any suitable manner such as by welding. These parts, however, are preferably integrally connected to provide a casing 1 of integral construction.

In order to connect conductors 33 (Figs. 5 and 7) positioned within the casing 1 to conductors located outside of the casing 1, there is provided a terminal block 16 which may be formed of an insulating material such as a phenolic resin. The block 16 is secured to the back closure 5 of the casing to support a plurality of terminals (not shown). Details of construction of these terminals may be found in application Serial No. 675,191, filed July 30, 1957.

Figure 2:
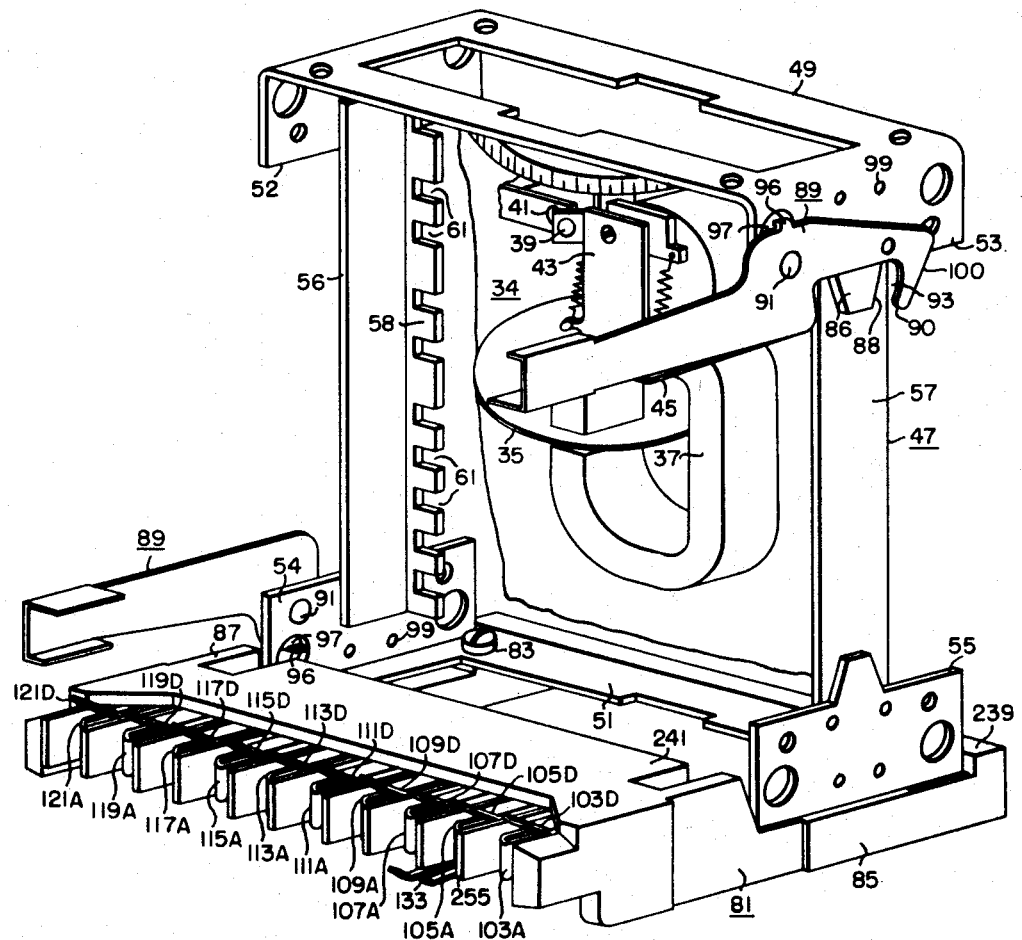
Fig. 2 is a view in front perspective with parts broken away of an electrical instrument suitable for insertion in the casing of Fig. 1.

The casing of Fig. 1 is proportioned to receive an electrical instrument of any suitable type such as that illustrated in Fig. 2. The specific instrument selected for the purpose of illustration is a conventional electrical relay represented generally by the numeral 34. To assist in orienting the relay which is of the induction type, attention may be directed to the induction disk armature 35 which rotates in the air gap of a damping magnet 37. The shaft on which the armature 35 is mounted carries a movable electrical contact 39 which is rotatably carried by the armature into engagement with a fixed electrical contact 41 to complete a control circuit when the relay is suitably energized. An operation indicator 43 having a resetting plate 45 also is illustrated.

In Fig. 2, the electrical relay 34 is secured within a suitable frame or chassis 47. Although the chassis may completely enclose the relay, if desired a complete enclosure generally is not required for the reason that the relay is intended to be enclosed within the casing 1 of Fig. 1.

As shown in Fig. 2, a skeleton frame or chassis 47 is provided which includes a pair of frame end pieces 49 and 51 of generally rectangular configuration having respectively depending terminal parts 52, 53 and 54, 55. These end pieces are connected by a pair of connecting strips 56 and 57 which are secured respectively to the terminal parts 52, 54 and the parts 53, 55. Each of the strips 56 and 57 includes an integral angle piece 58 with the angle pieces of the two strips projecting toward each other in a common plane. Each of these angle pieces has a plurality of notches 61 for receiving machine screws (not shown) which pass through openings in the structure of the relay 34. Suitable nuts (not shown) may be secured to the threaded ends of the screws for attaching the relay to the angle pieces and thereby to the chassis 47. The parts of the chassis may be formed of a metal such as steel and may be secured to each other in any suitable manner as by spot welding to form a rigid and sturdy structure.

To facilitate insertion and removal of the relay 34 with respect to the casing 1, it is desirable that the casing and the relay be provided with cooperating rails or guide surfaces. To this end the casing of Fig. 1 is provided with an insulating assembly including a base member 75 having a pair of projecting ribs 77 and 79 which are located adjacent opposite sides of the casing 1. These ribs 77 and 79 may be termed rails or guide surfaces for guiding the relay 34 into and out of operative position with respect to the casing 1.

In a somewhat analogous manner, an insulating member 81 is secured to the chassis 47 (Fig. 2) in any suitable manner as by machine screws 83 which pass through openings in the end piece 51 and which are received by threaded nuts held captive in openings of the insulating member 81. The insulating member 81 has ribs 85 and 87 projecting therefrom to provide rails or guide surfaces cooperating with the rails 77 and 79 of the base insulating member 75.

The chassis is secured to the casing by means of latches 89 which are pivotally secured to the terminal parts 53 and 54 by means of rivets 91. Each of the terminal parts 53 and 54 includes a projection with the projection 86 of the part 53 only being shown. These projections are of tapered configuration having surfaces 88 which define with surfaces 90 of the latches notches 93 for receiving pins 95 projecting inwardly from the wall 3 of the casing 1 (Fig. 1).

This arrangement facilitates the latching operation inasmuch as the surfaces 88 serve as stops to engage the pins 95 when the relay is properly positioned in the casing. Angular movement of the latches is limited by travel of integral stops 96 of the latches within openings 97 formed in the parts 53 and 54.

Figure 2A:
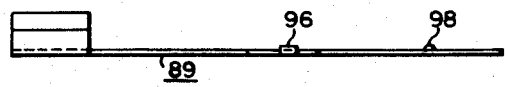
Fig. 2A is a top plan view of a latch used to hold the chassis to the casing.

In order to positively retain the latches in latching and unlatching positions the latches are provided with projections 98 (Fig. 2A) which engage openings 99 of the parts 53 and 54 when the latches are in the unlatching positions, and openings (not shown) of the parts 53 and 54 when the latches are in the latched position as illustrated in Fig. 2. The latches are provided with sloping surfaces 100 over which the pins 95 move during entry of the chassis into the casing to position the latches for the latching operation.

In order to connect the windings and contacts of the relay 34 to the terminals (not shown) of the casing 1, a plurality of switches is provided which include parts on the insulating member 75 (Fig. 1) and parts on the insulating member 81 (Fig. 2). Because of their proved reliability, knife switches are employed for establishing the desired connections. To this end a plurality of knife blade contact means 103, 105, 107, 109, 111, 113, 115, 117, 119 and 121 are pivotally secured to the base insulating member 75. Each of the knife blades is provided with a cooperating jaw contact means mounted on the insulating member 81 for movement with the relay 34 relative to the casing 1. Each contact jaw is identified by the reference character of its cooperating knife blade to which the letter A has been affixed.

By inspection of Figs. 1 and 2, it will be observed that when the relay 34 is in operative position within the casing 1, each of the knife blades may be actuated into engagement with its associated contact jaw. Before the relay can be removed from its operative position, the knife blades must be actuated away from the associated contact jaws. If desired, the knife blades may be proportioned as shown to have portions in the path of attachment of the cover 13 when the knife blades are in open positions. Such a construction permits attachment of the cover only when the switch knife blades are in closed positions.

Each of the windings and contacts of the relay 34 is connected to one or more of the associated contact jaws. Therefore, closure of the associated knife blades establishes an electrical connection between the windings and contacts of the electrical relay and conductors 33 carried by the casing 1. Although ten knife switches are illustrated in Figs. 1 and 2, it will be understood that the number of switches actually required depends on the particular relay or other instrument positioned within the chassis 47.

Figure 7:
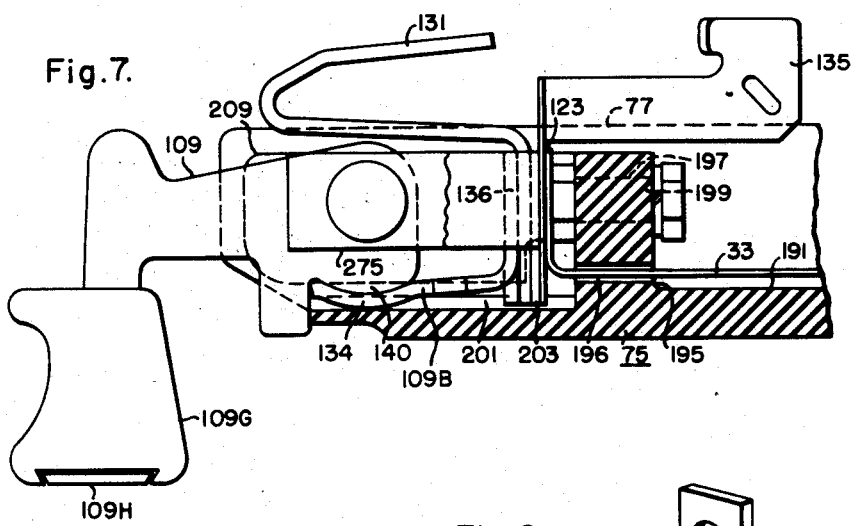
Fig. 7 is a detail view with parts in section showing a switch knife blade in engagement with a back contact constructed in accordance with the invention.

As shown in Figs. 5 and 7, the conductors 33 are in the form of elongated straps each having a pair of terminals with only the terminal 123 of one of the straps shown. These straps are positioned in side-by-side relation in engagement with the insulating member 75 and the terminal block 16 throughout substantially the entire lengths of the straps. This arrangement provides a very compact and neat appearing structure. The method of assembly of the straps to the member 75 and the block 16 is described in the above-mentioned application.

When the instrument supported in the chassis 47 includes a current circuit, it is desirable that means be provided for testing or checking the current flowing in such a circuit. For this purpose a jack is provided which includes a resilient blade 131 secured to the base insulating member 75 (Fig. 1) and a resilient blade 133 secured to the insulating member 81 (Fig. 2). These blades are so positioned that when the relay 34 is in operative position, the resilient blades 133 and 131 are in engagement. Therefore, if a current circuit is completed through these blades, a jack plug may be inserted therebetween for the purpose of connecting a current responsive instrument such as an ammeter in the current circuit.

It will be observed that the resilient blades 131 and 133 are slotted to permit passage of the knife blade 107 into engagement with its associated contact jaw. In this engaged position of the knife blade 107, the knife blade establishes a circuit in parallel with the jack represented by the resilient blades 131 and 133. Consequently, under most operating conditions the reliable contact of the knife switch is relied on rather than the contact between the resilient blades 131 and 133 of the jack. It should be observed further that the switch knife blade 107 must be opened before a jack plug can be inserted effectively between the resilient blades 131 and 133. Such opening of the knife switch blade is required to open the parallel circuit established thereby across a jack represented by the resilient blades 131 and 133.

Figure 8:
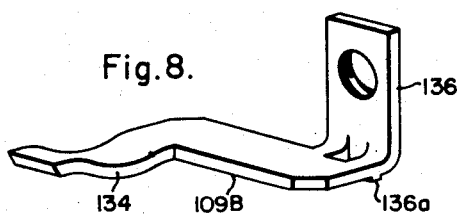
Fig. 8 is a view in perspective of the back contact shown in Fig. 7.

If the instrument supported by the chassis 47 and the casing 1 is energized in part from a current transformer, it is desirable that removal of the instrument should not open the circuit energized by the current transformer. To this end, the invention provides back contact means for one of the switches, such as that comprising the switch blade 109 and the contact jaw 109A, which is employed for completeing the circuit across the secondary winding of the current transformer. As shown in Figs. 5, 7 and 8 a back contact 109B is positioned directly beneath the knifeb lade 109 for engagement by the knift blade 109 as the knife blade is moved out of engagement with its associated contact jaw 109A. Engagement of the knife blade 109 with its back contact 109B is employed for maintaining a circuit across the secondary winding of the associated current transformer.

According to the present invention, the back contact 109B is in the form of an integral plate constructed of a suitable resilient electroconductive material. The plate 109B has the configuration illustrated in Fig. 8 and is supported by the insulating member 75 with a recessed terminal part 134 of the back contact located directly beneath the support for the blade 109 in a plane transverse to the plane of the blade 109. The other terminal part 136 of the plate 109B is secured to the support for the blade 107. The part 134 is spaced from the member 75 when in an unbiased condition so as to be engageable with a portion 140 of the blade 109 in advance of disengagement of the blade 109 and jaw 109A when the blade 109 is rotated to its open position as shown in Fig. 7. It is noted that the axis of rotation of the blade 109 is located intermediate the jaw contact means 109A and the plate 109B. The manner in which the plate 109B is secured in an operative position will be described hereinafter.

If the chassis 47 and the instrument supported thereby are removed from the casing 1, there is a possibility that the switch knife blade 109 may be actuated out of engagement with its back contact 109B to open the circuit across the secondary of the associated current transformer. To prevent such opening, an auxiliary switch is provided including a pair of resilient spring leafs 135 and 135a which are biased into engagement when the instrument is removed from the casing. These leafs are connected respectively to the knife blade 107 and the knife blade 109.

Figure 6:
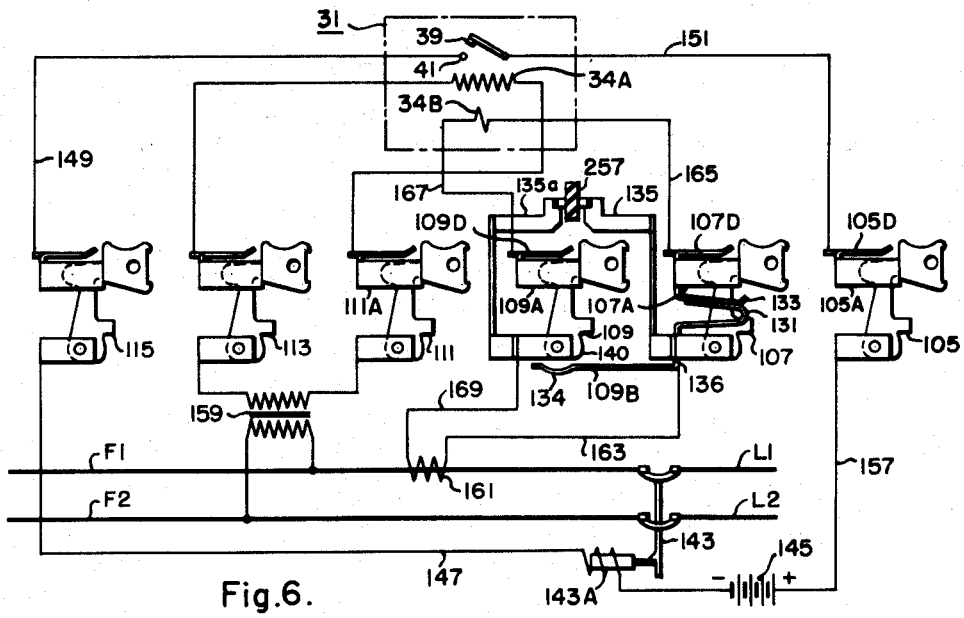
Fig. 6 is a schematic view showing circuit connections suitable for the electrical instrument and casing of Figs. 1 and 2.

The resilient spring leafs project into the path of movement of the insulating member 81 as the chassis is inserted in the casing 1, such that a portion 257 of the member 81 is passed between the leafs to disengage contacts carried by the leafs as shown in Figs. 5 and 6. Consequently, under normal operating conditions of the relay 34, the contacts carried by the spring leafs 135 and 135a are separated. When the relay 34 and its chassis 47 are removed from the casing 1, the spring leafs 135 and 135a are biased towards each other such that the contacts carried thereby are in engagement to establish a circuit across the secondary of the associated current transformer.

To facilitate testing of the electrical circuits associated with the relay, it is desirable that each of the contact jaws of the knife switches be provided with a suitable terminal. As shown in Fig. 2, each of the contact jaws may be provided with a terminal strip which is identified by the reference character applied to the associated knife blade to which the letter D is added. These terminal strips also serve to connect circuit conductors of the relay 34 to the associated contact jaws as will appear hereinafter.

With the construction and location of the parts in mind, it is believed that a brief description of a typical circuit embodying the invention will facilitate an understanding of the invention. Such a circuit is shown schematically in Fig. 6.

In Fig. 6 an electrical circuit is illustrated which includes feeder conductors F1 and F2 which are connected through a circuit interrupter 143 to load conductors L1 and L2. For the purpose of discussion, it will be assumed that the circuit represented by the feeder and load conductors is a single phase alternating-current circuit wherein the normal direction of power flow is from the feeder conductors to the load conductors. A tripping solenoid 143A is provided for tripping the circuit interrupter 143.

Tripping of the circuit interrupter 143 is controlled by the electrical relay 34. When the tripping contacts 39 and 41 of the relay 34 close, a tripping circuit is established for the tripping solenoid which may be traced from one terminal of a suitable source of electrical energy such as a battery 145, through the tripping solenoid 143A, a conductor 147, the switch knife blade 115, a conductor 149, the tripping contacts 41 and 39, a conductor 151, the switch knife blade 105 and a conductor 157 to the remaining terminal of the battery 145. When so energized, the tripping solenoid trips the circuit interrupter to disconnect the load conductors L1 and L2 from the feeder conductors F1 and F2.

For the purpose of discussion it is assumed that the relay 34 is a directional relay having a voltage winding 34A and a current winding 34B. The voltage winding 34A is energized from a voltage transformer 159 which has its primary winding connected across the conductors F1 and F2. The secondary winding of the voltage transformer is connected through the switch knife blades 111 and 113 to the voltage winding 34A.

Energization for the current winding 34B of the relay is derived from a current transformer 161 which is associated with the feeder conductor F1. The secondary winding of the current transformer is connected to the current winding 34B through a circuit which may be traced from one terminal of the secondary winding through a conductor 163, the switch knife blade 107, a conductor 165, the current winding 34B, a conductor 167, the switch knife blade 109 and a conductor 169 to the remaining terminal of the secondary winding.

As well understood in the art, the directional relay 34 may be adjusted to retain its tripping contacts in open condition as long as power flows in the normal direction from the feeder conductors F1 and F2 towards the load conductors L1 and L2. Should the direction of power flow reverse from its normal direction, the directional relay 34 operates to close its tripping contacts and trip the circuit interrupter 143.

It will be observed that the jack represented by the blades 131 and 133 is connected between the conductors 163 and 165. If it is desired to check or measure the current supplied to the current winding 34B, the switch knife blade 107 may be actuated to open condition. A jack plug which is connected to a suitable check or measuring device such as an ammeter, may then be inserted between the blades 131 and 133 to connect the ammeter in series with the current winding 34B. After the current has been measured, the jack plug may be removed and the switch knife blade 107 may be reclosed. Consequently, the switch knife blade and its associated contact jar are effective under normal operating conditions of the relay 34 to establish an excellent conductive path across the jack regardless of the condition of the jack blades. It will be observed further that the current circuit is opened at no time during the measuring operation.

Removal of the relay 34 from its casing requires an opening of the switch knife blade 109. As the switch knife blade 109 moves to open condition, the portion 140 of the blade 109 engages the back contact 109B to establish a short circuit across the terminals of the secondary of the current transformer 161. This short circuit may be traced from one terminal of the secondary through the conductor 163, the back contact 109B, the switch knife blade 109 and the conductor 169 to the remaining terminal of the current transformer. Since the switch knife blade 109 engages its back contact 109B before it completely disengages from its contact jaw 109A, the secondary of the current transformer is not open circuited at any time.

Since the latch 89 is in released condition and since the switch knife blades are in open condition, the relay 34 may be removed from its casing. As the relay 34 is withdrawn from the casing, the blades 131 and 133 separate. However, such separation does not open the secondary circuit of the current transformer for the reason that this circuit is completed through the back contact 109B.

As the relay 34 is withdrawn, the resilient spring leafs 135 and 135a are biased toward each other to permit engagement of the contacts carried thereby. This establishes a short circuit across the secondary of the current transformer 161 which is independent of the back contact 109B. This circuit may be traced from one terminal of the secondary through the conductor 163, the leaf 135, the leaf 135a and the conductor 169 to the remaining terminal of the secondary. Consequently, after withdrawal of the relay, the switch blade 109 may be released from its back contact 109B without open circuiting the secondary of the current transformer.

Before the relay can be reinserted in its casing, the switch knife blades must be in open condition. Insertion of the relay is effective to separate the spring leafs 135 and 135a. However, since the switch knife blade 109 must be in engagement with its back contact 109B, the separation of the spring leafs 135 and 135a does not open circuit the secondary of the current transformer 161. With the relay in its casing, the switch knife blades may be operated to closed condition.

It should be observed further that insertion of the relay in its casing automatically reengages the blades 131 and 133. Since the switch knife blade 109 engages its contact jaw 109A prior to its complete separation from the back contact 109B, the secondary of the current transformer 161 is not open circuited during such operation of the switch knife blade.

Although ten switch knife blades are illustrated in Fig. 1, only six of these knife blades are employed in the circuit of Fig. 6. The number of switch knife blades employed depends on the number of circuits required for the relay 34. Since only one current winding and one voltage winding are employed in the specific relay under consideration, only one pair of current switch knife blades and one pair of voltage switch knife blades are required.

Some electrical instruments require operations to be effected from a position exterior to their casings. For example, in Fig. 2 the operation indicator 43 may require resetting from the exterior of the associated casing. Such resetting may be effected by means of an integral resetting strap 180 shown in Figs. 3 and 3A. The strap 180 includes an end portion 181 which projects through the cover 13 as illustrated in Fig. 3. The strap 180 is guided for vertical movement by a pair of spaced guide means 182 which are integrally secured to the cover 13. As shown in Fig. 3, the strap has a portion 183 bent to underlie the resetting plate 45 of the operation indicator. Consequently, operation of the end portion 181 in an upward direction raises the resetting plate 45 to reset the associated operation indicator.

As shown in Figs. 3 and 4 each of the guide means 182 includes projections 184 and 185 of the cover which define a channel 186 for receiving the strap 180. The strap 180 is operatively retained within the channel 186 by means of a retaining plate 187 which is secured to the guide means by means of a screw 188 which passes through openings of the plate 187 and projections 184. The plate 187 further includes a pair of openings 189 for receiving tabs 190 which extend from the projections 185. The strap 180 has additionally a struck out portion 180a which serves as a stop to limit vertical movement of the strap by engaging the lower one of the guide means as viewed in Fig. 3. It is noted that the strap 180 is formed with notches 192 which may serve to retain a dust-proofing washer 193 for the cover in position.

The base insulating member 75 (Fig. 1) may be constructed in various ways. As shown in Figs. 1 and 7 more clearly the base insulating member 75 may have a base 191 from which the rails 77 and 79 project. A wall 195 extends between the rails 77 and 79 to connect the rails 77 and 79. The wall 195 has openings 197 through which bolts 199 may extend for the purpose of connecting thereto the switch knife blades. The wall 195 is provided with a plurality of slots 196 for receiving the conductors 33 as will presently appear. The base 191 is formed with a plurality of ribs 198 providing spaced channels 200 for receiving the conductors 33. To retain the switch knife blades more firmly in desired positions, the base insulating member may be provided with slots 201 which receive tongues 203 of the pivot supports 275 for the switch knife blades.

It is desirable that insulating partitions extend also between the switch knife blades. Such partitions may be molded together with the remainder of the base insulating member integrally from a suitable insulating material such as a phenolic resin. In the specific embodiment herein illustrated, U-shaped barriers 209 are secured to the wall 195 by the bolts which secure the switch knife blades thereto. These barriers are formed of a suitable insulating material such as nylon and have arms 207A and 209A extended between adjacent switch knife blades. The barriers have webs 209B positioned in slots 209C formed in the wall 195. These webs have openings aligned with the openings 197 to permit attachment of the barriers to the wall by means of bolts passing through the aligned openings. Suitable openings 237 may be provided in the rails 77 and 79 for permitting passage of machine screws 217 (Fig. 1) which extend through openings 218 of the casing for attaching the base insulating member to the casing.

The insulating member 81 includes a top wall 239 (Fig. 2) to which the rails 85 and 87 are attached. The insulating member 81 also carries a wall 241 which extends between the rails 87 and 85 as shown in Figs. 2 and 5. This wall contains openings 243 (Fig. 5) which permit passage of bolts 303 employed for attaching the contact jaws thereto.

Conveniently, the member 81 is provided with slots 245 designed for reception of tongues 247 (Fig. 5) of the contact jaws to prevent rotation of the contact jaws. The wall 241 also is provided with notches (not shown) for reception of U-shaped barriers 255 shown in Fig. 2. These barriers correspond to the barriers 209 of Fig. 1 and may be secured to the wall 241 in a similar manner by the screws employed for attaching the contact jaws to the wall 241. A plurality of spaced partitions 257 project rearwardly from the wall 241 to space conductors which are to be connected to the contact jaws. One of the partitions 257 may conveniently serve to space the spring leafs 135 and 135a when the chassis 47 is inserted in the casing.

The construction and mounting of the switches on their cooperating insulating members is illustrated in Fig. 5 which is a sectional view through portions of the insulating members 75 and 81 to show primarily the switch blade 109 and associated parts of the switching mechanism. In Fig. 5, the switch 109 is illustrated as pivotally mounted on a forked support 275.

The knife blade 109 may have a head 109G of suitable insulating material which may be molded thereon. Conveniently, the head may have a notch provided therein for the reception of a suitably colored or otherwise identified label 109H. The label may be cemented or otherwise secured to the head.

The terminal strip 109D has a depending struck down portion 302 with a threaded opening for reception of a threaded end of the bolt 303. The bolt hast a hexagonal head 305 intermediate the threaded end and the main threaded portion of the bolt. Between the portion 302 of the terminal strip 109D and the hexagonal head 305, the resilient blade 133 and the contact jaw 109A are firmly clamped. The blade 133 and the contact jaw 109A have openings permitting passage of the threaded end of the bolt therethrough into threaded engagement with the portion 302 of the terminal strip 109D. Both the blade 133 and the contact jaw 109A may have respectively extensions or tongues 307 and 247 for engaging one of the slots 245 provided in the insulating member 81. These tongues prevent rotation of the blade 133 and the contact jaw 109A with respect to the insulating member 81. The bolt 303 is secured to the wall 241 of the insulating member 81 in any suitable manner as by means of a nut 311.

As shown in Fig. 5, the strip 109D includes a terminal portion 312 which extends through a slot 313 of the wall 241. The portion 312 has an opening 314 into which projects a bare end of the conductor 167 of the relay 34. With this arrangement the conductor 167 is connected or disconnected to the associated strap 33 by operation of the blade 109. The associated strap 33 may be connected to the secondary of the transformer 161 and corresponds to the conductor 169 of Fig. 6.

As previously explained, the back contact 109B includes a part 134 associated with the switch blade 109. As best shown in Fig. 5, this back contact is attached to the insulating member 75 by means of the bolt 199 associated with the blade 107 which has a threaded end threadedly received in a threaded opening provided in the terminal part 136 of the back contact 109B. This bolt also serves to support the spring leaf 135. By inspection of Fig. 5, it will be observed that the bolt 199 associated with the switch blade 107 serves to electroconductively connect the spring leaf 135, the blade 131 and the back contact 109B. The back contact 109B further includes a tongue 136a which extends into the slot 201.

Although the invention has been described with reference to certain specific embodiments thereof, numerous modifications are possible, and it is desired to cover all modifications falling within the spirit and scope of the invention.

We claim as our invention:

1. In an electrical assembly for establishing a plurality of electrical connections, a first insulating member, a second insulating member mounted for movement relative to the first member from an operative position to a position displaced therefrom, switch means operable for establishing a first electrical connection, said switch means comprising a pair of first electrical contact means each mounted on a separate one of said insulating members one of said first contact means comprising actuable means including a contact portion of planar configuration with its plane transverse to the plane of movement of said second member, said contact portion being actuable into and out of engagement with the other of said first contact means when said second member is in its operative position, and second electrical contact means mounted on the same insulating member as said one of said first contact means to engage said contact portion in response to actuation of said actuable means for establishing a second electrical connection, said second contact means including an electroconductive part lying substantially in a plane substantially parallel to the plane of movement of said second member to intersect a plane including the contact portion, said electroconductive part being positioned for engagement with said contact portion in response to actuation of said actuable means.

2. In an electrical instrument assembly, a supporting structure unit, first electrical contact means carried by said supporting structure unit, an electrical instrument unit supported in operative position by said supporting structure unit, said instrument unit being movable from said operative position to a position displaced therefrom, second electrical contact means positioned on said instrument unit movable therewith between said positions, one of said contact means comprising actuable means rotatable about an axis when said instrument unit is in its operative position into and out of engagement with the other of said contact means for establishing a first electrical connection, and third electrical contact means mounted on the same unit as said one of said contact means for engagement with said actuable means in response to rotation of said actuable means for establishing a second electrical connection, said axis being positioned intermediate said other of said contact means and said third contact means when said instrument unit is in its operative position.

3. In an electrical instrument assembly, a supporting structure unit, first electrical contact means carried by said supporting structure unit, an electrical instrument unit supported in operative position by said supporting structure unit, said instrument unit being movable from said operative position to a position displaced therefrom, second electrical contact means positioned on said instrument unit movable therewith between said positions, one of said contact means comprising actuable means having a contact portion movable when said instrument unit is in its operative position into and out of engagement with the other of said contact means for establishing a first electrical connection, said contact portion lying in a plane transverse to the plane of movement of said instrument unit, and third electrical contact means mounted on the same unit as said one of said contact means operable in response to actuation of said actuable means for establishing a second electrical connection, said third contact means including a contact part lying substantially in a plane which extends transverse to said contact portion to intersect a plane including said contact portion, said contact part being mounted for biased engagement with said contact portion in response to movement of said contact portion in a direction to disengage said other of said contact means in advance of such disengagement.

4. In an electrical instrument assembly, a supporting structure unit, an electrical instrument unit supported in operative position by said supporting structure unit, said instrument unit being movable from said operative position to a position displaced therefrom, jaw contact means positioned on a first one of said units, blade contact means mounted for rotation on a second one of said units about an axis into and out of engagement with said jaw contact means when said instrument unit is in its operative position, and back contact means positioned for engagement with said blade contact means in response to rotation of said blade contact means in a direction to disengage said jaw contact means, the axis of rotation of said blade contact means being located intermediate said jaw contact means and said back contact means.

5. In an electrical instrument assembly, a supporting strutcure, an electrical instrument supported in operative position by said supporting structure, said instrument being movable from said opeartive position to a position displaced therefrom, jaw contact means positioned on said instrument, blade contact means including a terminal part mounted on said supporting structure, and a blade part mounted on said terminal part for rotation about an axis into and out of engagement with said jaw contact means when said instrument is in its operative position, and back contact means positioned on said supporting structure for engagement with said blade part in response to rotation of said blade part in a direction to disengage said jaw contact means, the portions of said blade part which engage said jaw and back contact means being spaced angularly about said axis, the portion of said blade part which engages said back contact means being located between said axis and said back contact means when in its engaging position.

6. In an electrical instrument assembly, a supporting structure, an electrical instrument supported in operative position by said supporting structure, said instrument being movable from said operative position to a position displaced therefrom, jaw contact means positioned on said instrument, blade contact means including a blade portion mounted for rotation on said supporting structure about an axis into and out of engagement with said jaw contact means when said instrument is in operative position, and back contact means positioned on said supporting structure for engagement with said blade portion in response to rotation of said blade portion in a direction to disengage said jaw contact means in advance of such disengagement, said back contact means including an electroconductive part lying substantially in a plane which is parallel to said axis with said axis located intermediate said jaw contact means and said electroconductive part, said electroconductive part having a recess which is curved about said axis, said blade portion having an edge with substantially the same curvature as said recess which is proportioned to enter said recess to engage said electroconductive part over an area curved about said axis.

7. In an electrical instrument assembly, a supporting structure, an electrical relay instrument supported in operative position by said supporting structure, said relay instrument being movable from said operative position to a position displaced therefrom, a pair of spaced jaw contact means positioned on said relay instrument, a pair of spaced blade contact means each mounted for rotation on said supporting structure into and out of engagement with a separate one of said jaw contact means when said relay instrument is in its operative position, and back contact means positioned on said supporting structure for engagement with one of said blade contact means in response to rotation of said one of said blade contact means in a direction to disengage the associated jaw contact means in advance of such disengagement, said back contact means comprising an electroconductive member having a pair of integrally connected terminal parts, one of said terminal parts being positioned for engagement by said one of said blade contact means with said axis located intermediate said jaw contact means and said one of said terminal parts, the other of said terminal parts being in engagement with the other of said blade contact means.

8. In an electrical instrument assembly, a supporting structure, an electrical relay instrument supported in operative position by said supporting structure, said relay instrument being movable from said operative position to a position displaced therefrom, said relay instrument including a current responsive winding, a current transformer to be energized in accordance with current of a circuit, said transformer including a secondary winding, a pair of spaced jaw contact means positioned on said relay instrument, spaced first conductor means each connected to said current winding and to a separate one of said jaw contact means, a pair of spaced blade contact means each mounted for rotation on said supporting structure about a common axis into and out of engagement with a separate one of said jaw contact means when said relay instrument is in its operative position, spaced second conductor means each connected to said secondary winding and to a separate one of said blade contact means, said jaw and blade contact means being effective when in engagement to connect said first and second conductor means to permit energization of said current winding from said secondary winding, and back contact means positioned on said supporting structure for engagement with said one of said blade contact means in response to rotation of said one of said blade contact means in a direction to disengage the associated jaw contact means, said back contact means including a first terminal part positioned for engagement with said one of said blade contact means in advance of disengagement of said one of said blade contact means and the associated jaw contact means, and a second terminal part integrally connected to said first part in engagement with the other of said blade contact means, said common axis being located intermediate said jaw contact means and said first terminal part.

9. In an electrical assembly for establishing a plurality of electrical connections, switch means operable for establishing a first electrical connection, said switch means comprising a pair of spaced contact jaws, a pair of spaced hinge terminals, and a pair of contact blades each mounted for rotation by a separate one of said hinge terminals about an axis into and out of engagement with the associated jaw, and a back contact mounted for engagement with one of said blades in response to rotation of said one of said blades for establishing a second electrical connection, said back contact comprising an electroconductive member having a pair of integrally connected parts, one of said connected parts being positioned in a plane extending transverse to said one of said blades to intersect a plane including said one of said blades, the other of said connected parts being in engagement with the hinge terminal for the other of said blades.

References Cited in the file of this patent

UNITED STATES PATENTS

| | | |
|---|---|---|
| 1,116,552 | Bissell | Nov. 10, 1914 |
| 2,388,675 | Chapman | Nov. 13, 1945 |
| 2,720,613 | Lustig | Oct. 11, 1955 |
| 2,809,244 | Owens | Oct. 8, 1957 |
| 2,824,916 | Steinmayer | Feb. 25, 1958 |

FOREIGN PATENTS

| | | |
|---|---|---|
| 662,344 | Great Britain | Dec. 5, 1951 |